Oct. 3, 1950     H. CARP     2,524,161
CORDLESS ELECTRIC IRON AND STAND
Filed June 24, 1946
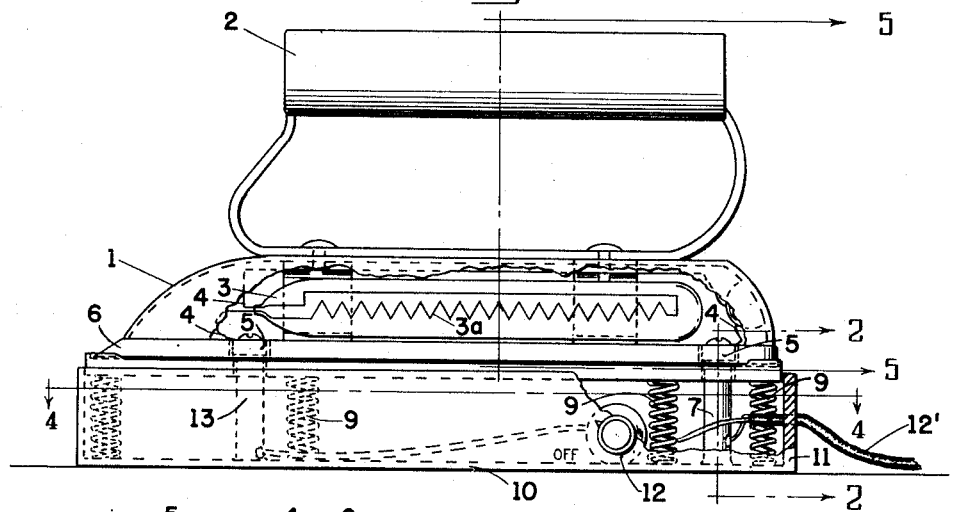
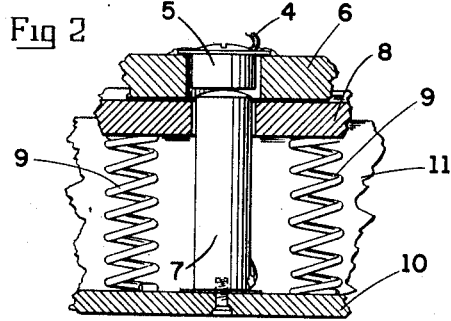
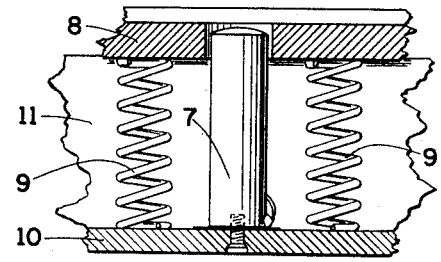
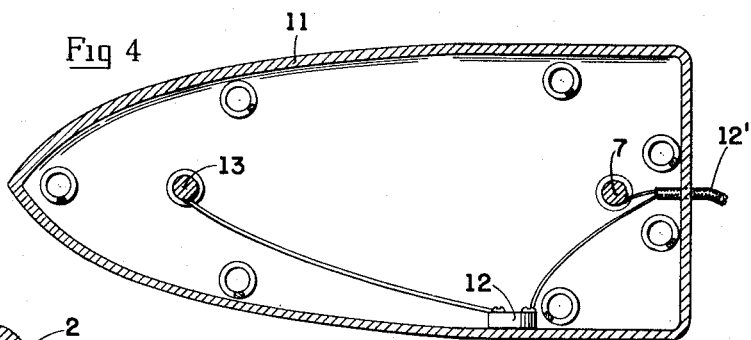
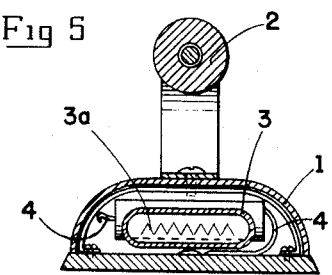
INVENTOR.
Harry Carp
BY *Victor J. Evans & Co.*
ATTORNEYS Patented Oct. 3, 1950

2,524,161

UNITED STATES PATENT OFFICE 2,524,161

CORDLESS ELECTRIC IRON AND STAND

Harry Carp, Chicago, Ill.

Application June 24, 1946, Serial No. 678,787

1 Claim. (Cl. 219—25)

This invention relates to improvements in electric sad irons, and more particularly to the provision of a cordless electric iron.

It is an object of the invention to provide a cordless electric iron of simple structure, which maintains its heat for a considerable length of time.

A further provision, which is an object of the invention, is a vacuum envelope of heat resisting glass, in which is embedded a high resistance heating wire providing a heating element, providing means for holding the heat for a length of time greater than is usual with such electric irons, the vacuum envelope forming a sort of tube.

These and other objects are attained by the novel arrangement and construction of parts hereinafter described and illustrated by the accompanying drawings, forming a part hereof, and in which:

Fig. 1 is an elevational view, partly broken away, of an electric iron embodying the invention.

Fig. 2 is a sectional view taken on the line 2—2 of Fig. 1.

Fig. 3 is a sectional view similar to that shown in Figure 2 with the iron removed.

Fig. 4 is a sectional view taken on line 4—4 of Fig. 1.

Fig. 5 is a sectional view taken on line 5—5 of Fig. 1, showing the grid of the heating element.

Referring to the drawings, the electric iron is shown to comprise a casing upon which is mounted a handle 2. In the casing is positioned a vacuum tube of high resisting glass, providing a sealed heat chamber. Positioned in tube 3 is a heating element 3a made of high heat resisting wire, or the like, having leads 4 which pass through the high heat resisting chamber 3, to contacts 5 in apertures in the base of the iron. The casing 1 is mounted on the sole plate or base 6, which has apertures for the contacts 5, the latter being flush with or slightly above the lower surface of the sole plate 6, and insulated therefrom.

The iron is adapted to rest on a stand having a base 10 from which upwardly project contact posts 7 and 13 arranged to engage the contacts 5 in the iron. The casing has side walls 11 adjacent which are coiled springs 9 engaging the underside of a floating plate 8, and the base of the stand 10. The contact posts pass through apertures in the plate 8 which is supported by the springs 9.

The posts 7 and 13 are connected in series with a rheostat 12, by means of which the heating of the iron is controlled.

In operation, the iron is placed on the plate 8 and the weight of the iron forces the plate down against the force of the springs 9 to cause the contacts 5 to engage the posts 7 and 13. There are two contacts 5, one at each end of the heating element 3a and the plate 6, and the contacts are fiber insulated from the plate 6. When the contact is made the iron will instantly start heating till a predetermined temperature is reached, at which point the circuit is broken by a thermostat, not shown.

When removed from the stand, the vacuum tube 3 maintains the heat, which allows the heat to remain in the iron an indefinite period of time, the heat flowing in a circular motion from the envelope 3 to the iron sole plate 6.

The iron described above, obviously, is of a much simpler structure than that of cordless irons heretofore produced. It is positive in operation, and safe from shock to the operator, as the plate 8 is insulated from and above the contact posts 7 and 13 when the iron is off of the stand, and there are no live electrical contacts to come in contact with an operator.

The above description is to be considered as illustrative and not limitative of the invention, of which modifications can be made without departing from the spirit and scope of the invention as set forth in the appended claim.

The invention having been described, what is claimed is:

In an electric iron, the combination which comprises an iron stand having a base with upwardly extended side walls and having an open upper end, a floating iron retaining plate positioned in the upper end of the stand, said plate having terminal openings therethrough, spaced vertically positioned springs positioned in the stand resiliently urging the said plate upwardly, terminal posts mounted in the stand in registering relation with the terminal openings of the floating plate and positioned with the upper ends thereof in the said openings, the upper ends of said posts terminating below the upper surface of the plate with the plate in the free position, an iron having a body and a base and having an electric heating element in a sealed heat resisting container in the body thereof, terminals in the said base of the iron positioned to contact the terminal posts of the stand with the floating plate depressed by the weight of the iron, means connecting the said terminals in the base of the iron to the heating element therein, and an electric cord extended to a source of current supply and connected to the terminal posts of the stand.

HARRY CARP.

REFERENCES CITED

The following references are of record in the file of this patent:

UNITED STATES PATENTS

| Number | Name | Date |
|---|---|---|
| 1,010,092 | Thomas | Nov. 28, 1911 |
| 1,400,437 | Hysell | Dec. 13, 1921 |
| 1,483,629 | Ruttenberg et al. | Feb. 12, 1924 |
| 1,664,758 | Reynolds | Apr. 3, 1928 |
| 2,147,085 | Brannon | Feb. 14, 1939 |
| 2,179,890 | Kaplan | Nov. 14, 1939 |
| 2,222,327 | Walkup | Nov. 19, 1940 |
| 2,284,132 | Chereton | May 26, 1942 |
| 2,297,779 | Kohler | Oct. 6, 1942 |
| 2,397,236 | Boyd | Mar. 26, 1946 |